United States Patent [19]

Shimano

[11] 4,454,784
[45] Jun. 19, 1984

[54] SPEED CHANGING DEVICE

[75] Inventor: Keizo Shimano, Sakai, Japan

[73] Assignee: Shimano Industrial Company Limited, Osaka, Japan

[21] Appl. No.: 317,342

[22] Filed: Nov. 2, 1981

[30] Foreign Application Priority Data

Nov. 19, 1980 [JP] Japan ............................ 55-166899[U]

[51] Int. Cl.³ ...................... G05G 5/20; G08B 3/02; B62K 23/06
[52] U.S. Cl. ........................................ 74/475; 74/527; 116/28.1; 116/67 R
[58] Field of Search ...................... 74/475, 527, 10.41; 116/28.1, 67 R, DIG. 20

[56] References Cited

U.S. PATENT DOCUMENTS

| 3,352,173 | 11/1967 | Freeland | 116/DIG. 20 |
|---|---|---|---|
| 3,570,325 | 3/1971 | Kroll et al. | 74/527 |
| 3,677,096 | 7/1972 | Hatman | 74/527 |
| 4,155,270 | 5/1979 | Juy | 116/67 R X |
| 4,343,201 | 8/1982 | Shimano | 74/475 |

*Primary Examiner*—Allan D. Herrmann
*Attorney, Agent, or Firm*—Stevens, Davis, Miller & Mosher

[57] ABSTRACT

A speed-changing device which supports an operating lever rotatably to a fixing member having a lever shaft, the lever being provided at a boss thereof with a cavity, the fixing member being provided with a support member entering into the cavity, the cavity housing therein a sound generating mechanism comprising a plurality of recesses and an engaging member, so that a sound generated by the engagement of engaging member with each recess is amplified by resonance of said cavity.

8 Claims, 3 Drawing Figures

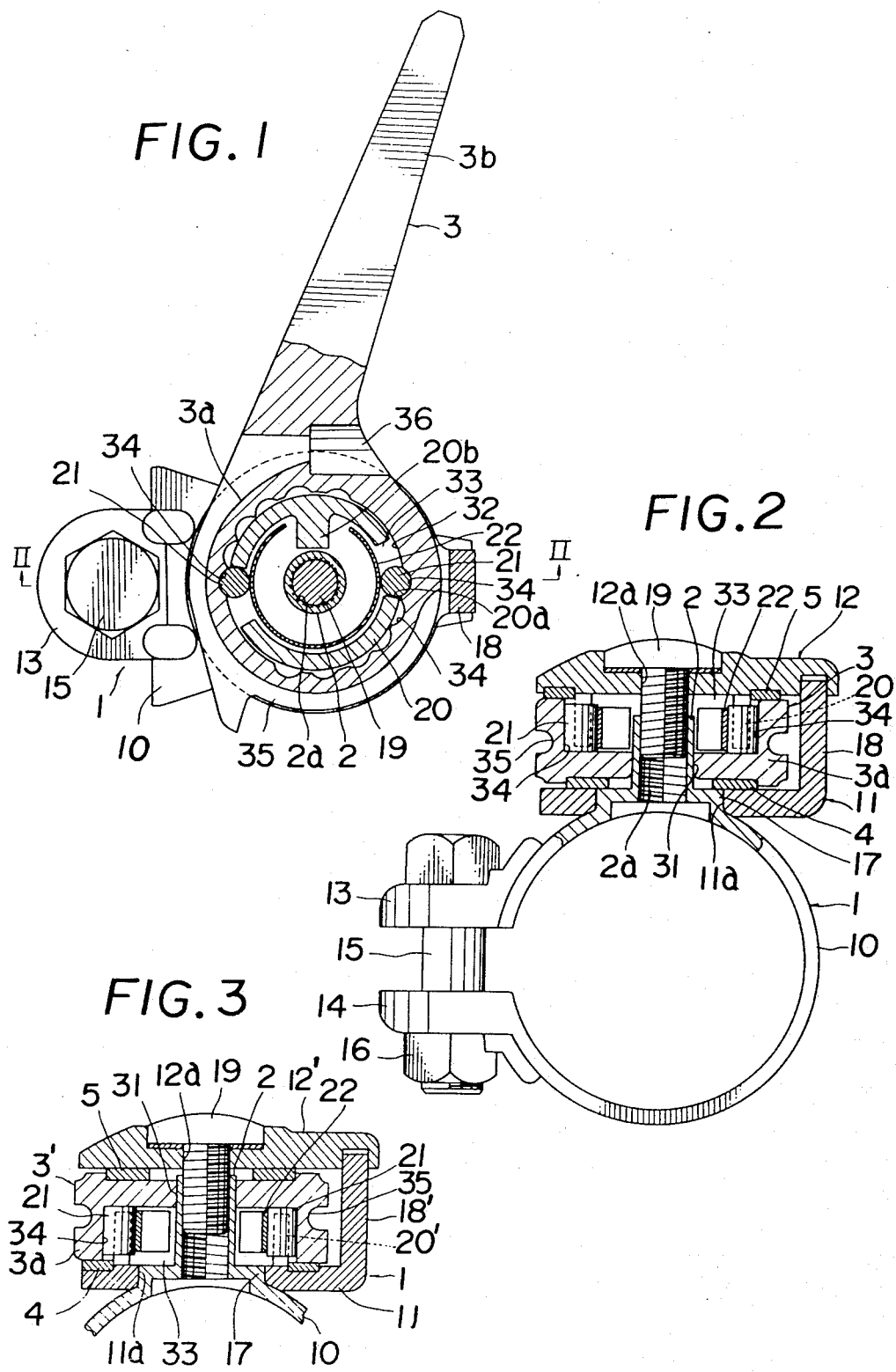

SPEED CHANGING DEVICE

FIELD OF THE INVENTION

This invention relates to a speed-changing device used mainly for a bicycle, and more particularly to a speed-changing device which supports an operating lever rotatably to a fixing member having a lever shaft so that the lever is turned to change over a derailleur at the bicycle into a predetermined speed-change stage.

BACKGROUND OF THE INVENTION

Conventionally, this kind of speed-changing device is well-known and it has a plurality of recesses at one of the outer periphery of a boss of the lever supported to the fixing member and the fixing member opposite to the outer periphery, and a ball engageable with each recess at the other, the ball being biased by a leaf spring toward each recess and engaging therewith to position the lever at a desired speed change stage and simultaneously maintain it thereat.

In such construction, the ball, when engaging with the recess, generates a sound which is too weak for a driver to accurately hear because the ball and recesses are provided between the opposite surfaces of the fixing member and the boss of operating lever, and are open to the exterior. Hence, the driver cannot accurately audibly check a speed change to a proper stage, causing him to rely on a visual check or on his sensing a switching condition of a drive chain to a desired one of multistage sprockets.

However, the visual check of the speed change stage cause the driver to divert his attention to watching where he is going which is dangerous. The sensing of a chain switching condition during pedaling is accurately performed by a skilled driver, but not by an unskilled one.

Since the aforesaid positioning mechanism in the conventional device is provided between the outer periphery of the boss and the fixing member opposite thereto, the fixing member should project in part outwardly with respect to the boss, which gives the device a bad appearance and enlarges it in size thereby subjecting it to more air resistance.

SUMMARY OF THE INVENTION

A main object of the invention is to provide a speed-changing device which generates a switching sound when the bicycle speed is changed, the sound being large enough to be audible by the driver, so that he can accurately check the proper speed change stage by means of his ears and not his eyes. Another object of the invention is to provide a speed-changing device of small size as a whole by reducing its outwardly projecting portion.

This invention has been designed to provide a round cavity formed on an inner periphery of a boss of an operating lever and a sound generating mechanism comprising a plurality of recesses and an engaging member assembled in the cavity, the boss serving as a resonator to amplify a sound generated during the engagement of the engaging member with each recess to make it easily audible to the driver.

In other words, a fixing member for supporting the lever is provided with a support member which enters into the aforesaid cavity at the boss of the operating lever, the sound generating mechanism being provided between the support member and the boss. The recesses are provided at the inner periphery of the boss and the engaging member engageable elastically with each recess is supported by the support member.

Accordingly, a sound generated when the engaging member engages with one recess, is amplified in resonance with the cavity to easily audible to the driver, whereby he can accurately check the proper speed change stage only by hearing.

Also, the sound generating mechanism provided within the cavity can eliminate projecting portions projecting largely outwardly with respect to the outer periphery of the boss of operating lever, so that the speed changing device of the invention is made compact as a whole. In addition the sound generating mechanism of the invention also is used for positioning the lever and holding it in position, and the recesses correspond in number to the number of speed change stages.

These and other objects of the invention will become more apparent in the detailed description and examples which follow.

BRIEF DESCRIPTION OF THE DRAWINGS

FIG. 1 is a partially cutaway front view of an embodiment of a speed changing device of the invention, FIG. 2 is a sectional view taken on the line II—II in FIG. 1, and FIG. 3 is a sectional view only of a principal portion of a modified embodiment of the invention.

DETAILED DESCRIPTION OF THE INVENTION

The speed-changing device of the invention mainly comprises a fixing member 1 having a lever shaft 2 and an operating lever 3 supported rotatably to the lever shaft 2.

The fixing member 1, as shown in FIG. 2, comprises a tightening band 10 of a substantially C-like shape, a disc-like shaped base plate 11, and a disc-shaped lid 12, the band 10 being provided at both ends thereof with tongues 13 and 14. A bolt 15 perforates through tongues 13 and 14 and a nut 16 is tightened to the bolt to fix the device to the bicycle frame e.g., a head pipe.

The lever shaft 2 projects from the tightening band 10 and has a threaded bore 2a at the center and a square swollen portion 17 at the root, the base plate 11 having a square bore 11a which is fitted onto the swollen portion 17, thereby coupling the base plate 11 with the tightening band 10.

The base plate 11, as shown in FIG. 2, has a rising portion 18 extending in parallel to the axis of lever shaft 2, so that the lid 12 is fitted at one side thereof onto the rising portion 18 and a bolt 19 is inserted through the central bore 12a at the lid 12 and screws with the lever shaft 2, thereby fixing the base plate 11 to the band 10.

The lever shaft 2 alternatively may be integral with the base plate 11, or separate from the band 10 or base plate 11 and then fixed thereto.

The lever 3 comprises a boss 3a and a grip or operating portion 3b, the boss 3a having a central bore 31 to be fitted onto the lever shaft 2. The lever 3 is mounted on the fixing member 1 in such a manner that the boss 3a at first is fitted onto the lever shaft 2 through the bore 31 interposing a washer 4 of synthetic resin between the boss 3a and the base plate 11, then the lid 12 is placed on the boss 3a through a washer 5 of synthetic resin interposed between the lid 12 and the boss 3a, and the bolt 19, as abovementioned, screws with a threaded bore 2a at the lever shaft 2. Hence, the lever 3 is subjected to the predetermined frictional resistance and the lid 12 is mounted not-rotatably to the base plate 11 through the fitting of the tip of rising portion 18 into one side portion of lid 12. In addition, the rising portion 18 may be replaced by other means.

At the boss 3a of operating lever 3 is provided a round recess 32 open opposite to the lid 12, larger in diameter than the shaft bore 31, and concentric therewith, thereby forming a cavity 33. A cylindrical support member 20 which enters into the cavity 33 is provided at the lid 12, a plurality of recesses 34 corresponding in number to the speed change stages are provided at the inner periphery of boss 3a forming the cavity 33, and an engaging member 21 engageable with each recess 34 is carried elastically by the support member 20, so that the engaging member 21 and recesses 34 form a sound generating mechanism. The sound generating mechanism generates a sound when the engaging member 21 engages with each recess 34, and serves to position the lever 3 at a desired speed change stage and maintain it thereat.

The engaging member 21 is inserted into a bore 20a provided at the support member 20 and a substantially C-like shaped ring spring 22 is provided inside the support member 20 to thereby bias the engaging member 21 radially outwardly. In addition, the ring spring 22 may be replaced by other elastically biasing means. The engaging member 21 uses a roller, which may be replaced by other rolling members, e.g., a ball, or a pawl, but the use of rolling body, such as a roller or ball, is advantageous in producing less wear at the engaging member 21 and recesses 34.

Alternatively, a pair of the above sound generating mechanisms may be used as shown, and the support member 20 may be provided at the base plate 11 as shown in FIG. 3, or may be at the lever shaft 2 or tightening band 10 (not shown). In these instances, the recess 32 at the lever 3, as shown in FIG. 3, is open opposite to the base plate 11. Also, the support member 20 need not be always cylindrical, but it is sufficient for it to be formed to elastically support the engaging member 21.

Incidentally, the boss 3a of lever 3 has a groove 35 for winding therein a control wire (not shown) and a retaining bore 36 for receiving an end piece of the wire.

In the drawing, reference numeral 20b designates a stopper for the ring spring 22, provided at the support member 20.

In the above construction of the invention, the control wire (not shown), as well-known, connects the operating lever 3 and a derailleur (not shown), and the lever 3 is operated to move a movable member at the derailleur to change the bicycle speed into a desired speed change stage.

When the lever 3 is turned, the engaging member 21 disengages from one recess 34 against the ring spring 22 and rides over the boundary to the adjacent recess 34 and then engages therewith by a spring force of ring spring 22, at which time a sound is generated by the engagement and resonates within the cavity 33 so as to be amplified and then travels outwardly.

As seen from the above, the speed-changing device of the invention has the cavity at the boss of the operating lever, the cavity housing therein the sound generating mechanism comprising the plurality of recesses and the engaging member, so that, when the engaging member engages with each recess, a sound is generated from the sound generating mechanism and amplified by resonance with the cavity to thereby be easily audible to the driver. Hence, he can accurately check the speed change stage only by hearing.

Also, the provision of a sound generating mechanism within the cavity eliminates the outwardly projecting portion of fixing member from the boss of the operating lever, whereby the device is made compact to that extent, has a good appearance, and is subjected to less air resistance.

Furthermore, the sound generating mechanism also can serve to position the lever in a desired speed change stage and maintain it thereat.

While preferred embodiments of the invention have been shown and described, the invention is not limited to the specific construction thereof, which is merely exemplary in the specification rather than defined.

What is claimed is:

1. A speed-change device comprising:
   a fixing member having a lever shaft;
   an operating lever provided with a boss supported rotatably to the fixing member and having an operating portion, the boss at the lever being provided with a shaft bore fitted onto the lever shaft and a cavity larger in diameter than the shaft bore, the fixing member having a support member fitted circumferentially with respect to the cavity;
   a plurality of recesses formed at one of the boss and the support member;
   a pair of engaging members provided at the other of said boss and support member engageable with the recesses, the engaging members being exposed toward a center of said cavity, each of engaging members elastically engaging with the recesses; and
   a ring spring housed within said cavity at its central side for biassing said engaging members into elastic engagement with said recesses.

2. A speed-changing device as in claim 1, wherein said plurality of recesses and pair of engaging members engageable elastically with said recesses function as a sound generating mechanism.

3. A speed-changing device according to claim 1, wherein said recesses are provided at the inner periphery of said boss, which forms said cavity, said engaging members being supported to said support member.

4. A speed-changing device according to claim 1, wherein said fixing member has a lid opposite to said boss at said lever, said support member being fixed to said lid.

5. A speed-changing device according to claim 1, wherein said fixing member comprises a tightening band, a base plate fixed thereto, and a lid supported to said base plate, said base plate carrying said support member.

6. A speed-changing device according to claim 1, wherein said support member has a stopper for said ring spring.

7. A speed-changing device according to claim 1, wherein said engaging member is a roller.

8. A speed-changing device according to claim 1, wherein said engaging member is a ball.

* * * * *